US011840196B2

(12) United States Patent
Tripathy et al.

(10) Patent No.: US 11,840,196 B2
(45) Date of Patent: Dec. 12, 2023

(54) VEHICLE ACCESS CONTROL SYSTEM

(71) Applicant: Westinghouse Air Brake Technologies Corporation, Pittsburgh, PA (US)

(72) Inventors: Janmejay Tripathy, Cedar Rapids, IA (US); Irwin Morris, Marion, IA (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 36 days.

(21) Appl. No.: 17/522,121

(22) Filed: Nov. 9, 2021

(65) Prior Publication Data

US 2022/0176909 A1 Jun. 9, 2022

Related U.S. Application Data (60) Provisional application No. 63/121,111, filed on Dec. 3, 2020.

(51) Int. Cl.
| | | |
|---|---|---|
| *B60R 25/24* | (2013.01) | |
| *B60R 25/04* | (2013.01) | |
| *B60R 25/30* | (2013.01) | |
| *B60R 25/10* | (2013.01) | |
| *B60R 25/08* | (2006.01) | |

(52) U.S. Cl.
CPC ............. *B60R 25/24* (2013.01); *B60R 25/04* (2013.01); *B60R 25/08* (2013.01); *B60R 25/10* (2013.01); *B60R 25/305* (2013.01)

(58) Field of Classification Search
CPC ......... B60R 25/24; B60R 25/04; B60R 25/08; B60R 25/10; B60R 25/305
See application file for complete search history.

(56) References Cited

U.S. PATENT DOCUMENTS

| | | | | |
|---|---|---|---|---|
| 10,300,888 | B1* | 5/2019 | Gilbert-Eyres | ........ H04N 7/185 |
| 2007/0228813 | A1* | 10/2007 | Smith | ..................... B60T 13/66 303/7 |
| 2010/0237191 | A1* | 9/2010 | Schneider | .............. B64D 11/00 244/118.5 |
| 2011/0273269 | A1* | 11/2011 | Pujol | .................. G07C 9/00896 340/12.5 |

(Continued)

OTHER PUBLICATIONS

Notice of Requisition for corresponding CA Application No. 3,138,438 dated Feb. 9, 2023 (4 pages).

*Primary Examiner* — Thomas D Alunkal
(74) *Attorney, Agent, or Firm* — THE SMALL PATENT LAW GROUP LLC; Mary D. Lawlor (57) ABSTRACT

A control system and a related method includes determining an access state of a vehicle and communicating a locking command message from an off-board control system to remotely change the access state of the vehicle between a locked state and an unlocked state. In the locked state, an operator is unable to one or more of access a location of the vehicle, access an area internal to the vehicle, change a power setting of a component of the vehicle, or engage a propulsion system of the vehicle. The operator onboard the vehicle may be prohibited from changing the access state from the locked state to the unlocked state without assistance from the off-board control system, but the operator may be allowed to change the access state from the unlocked state to the locked state without assistance from the off-board control system.

22 Claims, 2 Drawing Sheets

(56) References Cited

U.S. PATENT DOCUMENTS

2016/0325846 A1* 11/2016 Kearns ............... B64D 45/0059
2017/0043881 A1*  2/2017 Fleck ................ B64D 45/0053
2017/0168501 A1*  6/2017 Ogura ................ G05D 1/0278
2017/0203839 A1*  7/2017 Giannini ............... B64D 27/24

* cited by examiner

VEHICLE ACCESS CONTROL SYSTEM

CROSS-REFERENCE TO RELATED APPLICATIONS

This application claims priority to U.S. Provisional Application No. 63/121,111, filed Dec. 3, 2020, which is incorporated by reference herein in its entirety.

BACKGROUND

Technical Field

The subject matter described herein relates to security systems of a vehicle and related methods.

Discussion of Art

Vehicles security systems exist to control access and/or control of a vehicle. As one example, a car locking system may prohibit an individual that is not in possession of a key of the vehicle from accessing the vehicle, or the individual may be unable to start the engine of the vehicle without the key. As another example, locomotives may be the target of robberies based on the cargo the locomotive may be carrying. A locomotive may also be targeted by individuals attempting to cause harm to people onboard the locomotive, or to use the locomotive to cause harm to other structures. Existing vehicle security systems, however, are not without issues. For example, a person attempting to board or operate the vehicle, or threaten an operator of the vehicle may be able to bypass the security system. Additional security measures may be needed in order to ensure safety to the vehicle, and individuals and/or property onboard the vehicle. It may be desirable to have an access control system and method that differs from those that are currently available.

BRIEF DESCRIPTION

In accordance with one example or aspect, a method includes determining an access state of a vehicle and communicating a locking command message from an off-board control system to remotely change the access state of the vehicle between a locked state and an unlocked state. In the locked state, an operator onboard the vehicle is unable to one or more of access a location of the vehicle, access an area internal to the vehicle, change a power setting of a component of the vehicle, or engage a propulsion system of the vehicle. The operator onboard the vehicle may be prohibited from changing the access state from the locked state to the unlocked state without assistance from the off-board control system. The operator onboard the vehicle may be allowed to change the access state from the unlocked state to the locked state without assistance from the off-board control system.

In accordance with one example or aspect, a control system includes a controller having one or more processors configured to determine an access state of a vehicle, and a communication system configured to communicate a locking command message to the vehicle to remotely change the access state of the vehicle between a locked state and an unlocked state. In the locked state, an operator or an individual onboard the vehicle is unable to one or more of access a location of the vehicle, access an area internal to the vehicle, change a power setting of a component of the vehicle, or engage a propulsion system of the vehicle.

In accordance with another example or aspect, a method includes receiving a locking notification from a vehicle indicating that an access state of the vehicle is to change from an unlocked state to a locked state. An unlocking request may be received from the vehicle indicating a request to change the access state from the locked state to the unlocked state. A determination is made whether the access state of the vehicle is allowed to change from the locked state to the unlocked state. An unlocking command message may be communicated from an off-board positive vehicle control (PVC) system to the vehicle to remotely change the access state from the locked state to the unlocked state responsive to determining that the access state of the vehicle is allowed to change from the locked state to the unlocked state. An operator onboard the vehicle may be prohibited from changing the access state from the locked state to the unlocked state.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a vehicle, and a method of controlling an access state of the vehicle. The access state of the vehicle may be remotely controlled by a control system disposed off-board the vehicle, by a controller onboard the vehicle, or a combination of the two therein. The access state of the vehicle may be controlled, for example, as a result of security and/or safety needs of the vehicle. As one example, the off-board control system may determine that the access state of the vehicle may need to change between an unlocked state and a locked state, and may remotely change the access state of the vehicle by communicating a locking command message or an unlocking command message to the vehicle. As another example, the off-board control system may receive a locking request from the vehicle, and may change the access state based on the locking request by communicating a locking command message to the vehicle. As another example, an operator onboard the vehicle may change the access state from the unlocked state to the locked state. Optionally, the operator onboard the vehicle may be prohibited from changing the access state from the locked state to the unlocked state, for example, without assistance from the off-board control system.

The access state of the vehicle may be changed responsive to unauthorized access to the vehicle, or to an area of the vehicle. For example, the access state of the vehicle may change between an unlocked state and a locked state in the case of robbery, to cause harm to the vehicle, passengers, and/or cargo onboard the vehicle, or the like, to increase a level of security of the vehicle. In one example, an unauthorized individual may attempt to access an area of the vehicle, and the operator may change the access state of the vehicle from the unlocked state to the locked state, such as to prohibit the unauthorized individual from controlling operating settings of the vehicle, accessing cargo of the vehicle, or the like. As an additional security measure, the operator onboard the vehicle (or the unauthorized individual) may be prohibited from changing the access state from the locked state to the unlocked state. For example, the operator onboard the vehicle may be prohibited from changing the access state to the unlocked state regardless of threats made by the unauthorized individual, or the unauthorized individual may be unable to or prohibited to override the locked access state of the vehicle without receiving unlocking permissions from the off-board control system.

In one or more embodiments, the vehicle may change between the unlocked state and the locked state while the vehicle is occupied and/or unoccupied (e.g., with operators, passengers, cargo, or the like). As one example, an operator may change the access state of a first vehicle to the locked state prior to the operator deboarding the first vehicle. The operator may request the off-board controller to change the state of the first vehicle to the unlocked state responsive to the operator re-boarding the first vehicle.

The locking command message communicated by the off-board control system to change the access state between the unlocked state and the locked state may control one or more operational settings of the vehicle. For example, the locking command message may change a component of the vehicle from an off-state to an on-state (e.g., power up or down a control console of the vehicle, a communication system, a battery system, an engine starter, one or more auxiliary electronics, or the like). Optionally, the locking command message may control one or more operational settings of various systems of the vehicle such as a propulsion system, a braking system, or the like. Optionally, the locking command message may engage the propulsion and/or braking system, such as by providing power to and/or unlocking the brakes, such as by blocks or clamps. Optionally, the locking command message may prohibit or prevent access of a location of the vehicle, such as by concealing the location where the vehicle is located or stored, such as in a yard or a shed. Optionally, the locking command message may prohibit or prevent access to an area of the vehicle, such as a cab of the vehicle, an engine compartment, cargo bay, or the like, by remotely controlling a locking system of the vehicle.

In one or more embodiments, the off-board control system may include and/or be an energy management system that can include hardware circuits and/or circuitry that include and/or are connected with one or more processors that perform the operations described herein in connection with the off-board control system and/or energy management system. The energy management system can create a trip plan for trips of the vehicle. The trip plan may designate operational settings of propulsion-generating vehicles as a function of one or more of time, location, or distance along the route for the trip. For example, traveling according to the operational settings designated by the trip plan may reduce fuel consumed and/or emissions generated by the vehicle relative to the vehicle traveling according to other operational settings that are not designated by the trip plan. For example, the trip plan designated by the energy management system may optimize travel of the vehicle. In one embodiment, the energy management system off-board the vehicle may communicate the locking command message to the vehicle. The locking command message may be communicated automatically, responsive to the energy management system receiving a locking request, responsive to an alarm or trigger event (e.g., unauthorized access to the vehicle was detected, or the like), or the like. The locking command message may automatically change a setting of the propulsion system, such as by disabling a throttle of the propulsion system, change a brake setting of the vehicle, or the like.

In one embodiment, the access state of the vehicle may be changed based on input and/or control by one or more controllers and/or operators onboard and/or off-board the vehicle. As one example, the off-board control system may determine that the access state of the vehicle is in the unlocked state, and may determined that the access state is to be changed to the locked state. The off-board controller may receive sensor signals (e.g., camera and/or video images of the vehicle) from sensors onboard the vehicle, sensors disposed at wayside devices, sensors disposed onboard drones, satellites, or other moving devices, or the like, and may determine that the access state of the vehicle may need to change based on the sensor signals. The off-board controller may automatically communicate the locking command message to the vehicle, or optionally, an operator of the off-board control system may receive and review the sensor signals, and manually input the locking command message to be communicated with the vehicle. As another example, an operator onboard the vehicle may determine that the access state needs to be changed, and may manually control the onboard controller to change the access state of the vehicle. Optionally, the onboard operator may manually input a locking request to be communicated to the off-board controller requesting the off-board controller to change the access state of the vehicle. As another example, the controller onboard the vehicle may automatically change the access state of the vehicle, and/or optionally may automatically communicate the locking request to the off-board controller.

In one embodiment, the off-board control system may determine that the vehicle is in the locked state, and may determine that the access state is to change to the unlocked state. The off-board control system may communicate an unlocking command message to the vehicle to remotely change the access state of the vehicle from the locked state to the unlocked state. As a security measure, the access state of the vehicle may be unchanged by controller of the vehicle. For example, while the vehicle is in the locked state, the onboard controller, an operator onboard the vehicle, or another individual onboard the vehicle may be prohibited from changing the vehicle from the locked state to the unlocked state. Optionally, the onboard controller and/or the operator onboard the vehicle may change the vehicle to the unlocked state responsive to receiving permission to do so from the off-board controller. For example, either of the operator onboard the vehicle or the off-board control system may independently change the access state of the vehicle from the unlocked state to the locked state. Alternatively, the operator onboard the vehicle is prohibited from changing the access state from the locked state to the unlocked state without remote assistance from the off-board control system.

While some embodiments described herein relate to rail vehicles, not all embodiments of the inventive subject matter are restricted to rail vehicles. One or more embodiments of the inventive subject matter may relate to other types or models of vehicles, such as automobiles, trucks, buses, mining vehicles, marine vessels, aircraft (manned or unmanned, such as drones), agricultural vehicles, or other off-highway vehicles. Additionally, the vehicles may be included in vehicle systems that may include two or more different types of vehicles that may operate as a common vehicle system and that may communicate with each other and/or the off-board control system.

Figure 1:
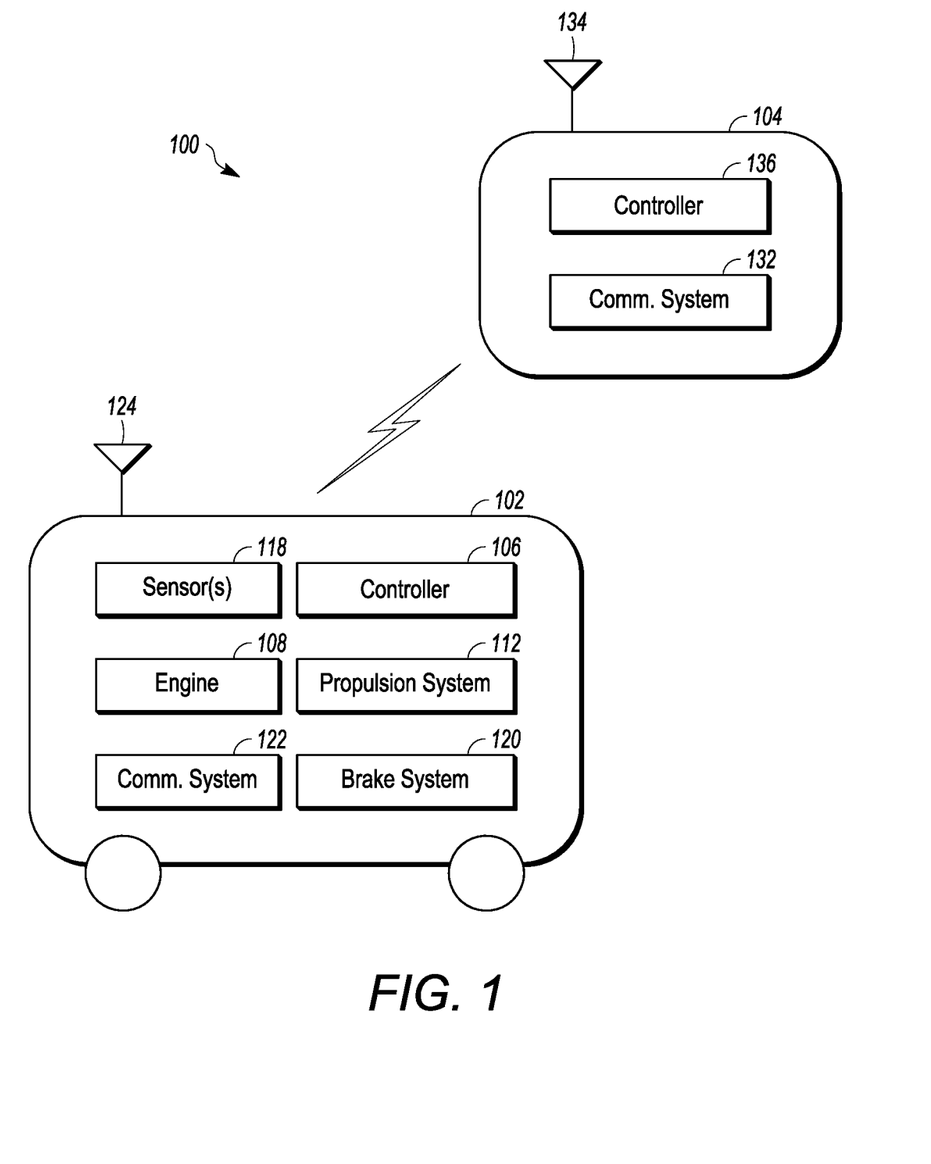
FIG. 1 illustrates one example of a vehicle system and a control system in accordance with one embodiment.

FIG. 1 illustrates one example of a system 100 that includes a vehicle 102 and an off-board control system 104. The vehicle can be a rail vehicle, but optionally can be an automobile, a truck, a bus, a mining vehicle, a marine vessel, an aircraft, an agricultural vehicle, or another off-highway vehicle. The illustrated vehicle includes a single vehicle, but optionally can be formed from two or more vehicles that may travel together (by being mechanically coupled or by being mechanically separate but communicating with each other to travel together, such as in a convoy). The vehicle travels along a route (not shown), such as tracks, roads, highways, land-based paths, airborne paths, waterways, or the like.

The vehicle includes a controller 106, which may be referred to as an onboard controller. The onboard controller can represent hardware circuitry that includes and/or is connected with one or more processors, such as one or more microprocessors, field programmable gate arrays, integrated circuits, and/or the like, that perform operations described in connection with the onboard controller. The controller can represent an engine control unit. The onboard controller communicates with an engine 108 of the vehicle. The engine can be a fuel-consuming engine, such as a diesel engine. Not all embodiments of the inventive subject matter, however, are limited to diesel engines. The engine can represent another type of engine that consumes fuel other than diesel fuel.

The onboard controller can communicate with onboard and/or off-board components via a communication system 122. The communication system represents transceiving circuitry, one or more antennas 124, modems, or the like. In one or more embodiments, the communication system may receive and provide data signals to the onboard controller. The communication system may be the same as or similar to other communication systems described herein.

The vehicle includes a propulsion system 112 that operates to move the vehicle along the route. The propulsion system can represent one or more engines, motors, transmissions, propellers, or the like, that generate propulsion to move the vehicle system. The vehicle also can include a brake system 120 that operates to slow or stop movement of the vehicle system. The brake system can include air brakes, friction brakes, motors (e.g., used for dynamic or regenerative braking), or the like. The onboard controller can communicate control signals with the propulsion system and/or the brake system to control or change movement of the vehicle.

The vehicle may include one or more powered components, such as an auxiliary system (not shown), that can represent one or more loads that consume some power of the vehicle. The powered components can represent fans (e.g., blowers that cool parts of the propulsion system, blowers that cool braking resistors, pumps that force coolant to cool the engine or other components, etc.), heating and/or cooling systems that heat or cool an operator cab of the vehicle, or the like.

One or more sensors 118 of the vehicle may sense characteristics of operation of the vehicle and/or environment, and output signals (e.g., wireless signals and/or signals that are conducted via one or more conductive pathways such as wires, cable, buses, etc.) The sensors may represent cameras, motion detectors, temperature detection sensors, chemical and/or poison detection sensors, positioning sensors, accelerometers, barometers, or the like. The sensors may sense characteristics of the vehicle, of the environment inside an area of the vehicle (e.g., inside a cab of the vehicle), of the environment outside of the vehicle, operating conditions of the vehicle, characteristics of a cargo that may be onboard and/or carried by the vehicle, characteristics of an operator and/or passenger onboard the vehicle, or the like.

The off-board control system 104 communicates with the onboard controller of the vehicle via a communication system 132. The communication system represents transceiving circuitry, one or more antennas 134, modems, or the like. In one or more embodiments, the communication system may receive and provide data signals to the onboard controller. The communication system may be the same as or similar to other communication systems described herein.

The off-board control system includes a controller 136, which may be referred to herein as an off-board controller, that can represent hardware circuitry that includes and/or is connected with one or more processors that perform operations of the off-board control system. In one or more embodiments, the off-board controller can communicate with the onboard controller of the vehicle to control one or more operations of the vehicle. For example, the off-board controller can communicate with the onboard controller of the vehicle to notify the vehicle where the vehicle is allowed to travel, how fast the vehicle is allowed to travel, or the like.

In one embodiment, the off-board control system may represent a back-office server of a positive vehicle control (PVC) system. A PVC system is a control system in which a vehicle is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board control system represents another computerized system that communicates with vehicles and/or vehicle systems described herein.

In one embodiment, the back-office server of the PVC system may communicate the locking command message to the vehicle. The locking command message from the PVC system may disable movement control authorities from being received by the vehicle. For example, the vehicle may only be allowed to move or change a setting of a braking or propulsion systems responsive to receiving a movement control authority, bulletin, or notification. When the vehicle is in the locked state, the vehicle may be unable to or prohibited from receiving a movement control authority or bulletin, and therefore may be unable to move until the PVC system enables or allows the vehicle to receive movement control authorities.

The onboard and/or off-board controllers may include an input and/or output device (not shown) for use by an operator to manually control one or more operations, settings, or the like, of the onboard and/or off-board controllers. In one or more embodiments, the onboard and/or off-board controllers may include a memory or storage system (not shown). For example, a memory can store information about the vehicle, the route, or the like. Nonlimiting examples of information that may be stored in the memory of the onboard and/or off-board controllers may include identification of each vehicle of a vehicle system, data related to the route, how the vehicle is or has been operated as the vehicle moves along the route, time stamps related to when the vehicle moves or moved passed wayside devices, moved from a first geospatial area into a different geospatial area, when the vehicle is moving and when the vehicle is stationary, current and passed propulsion settings of the vehicle system, current and passed braking settings of the vehicle, time stamps and/or propulsion and braking settings to when the vehicle moves or moved passed route features (e.g., geographic features such as hills or valleys, infrastructure features such as bridges, rail switches, pedestrian and/or vehicle crossings or intersections, or the like). In one or more embodiments, the onboard and/or off-board controller may correlate two or more informational data with each other to understand how the vehicle moves along the route, or did move along the route during one or more past traversals of the vehicle along the route.

Figure 2:
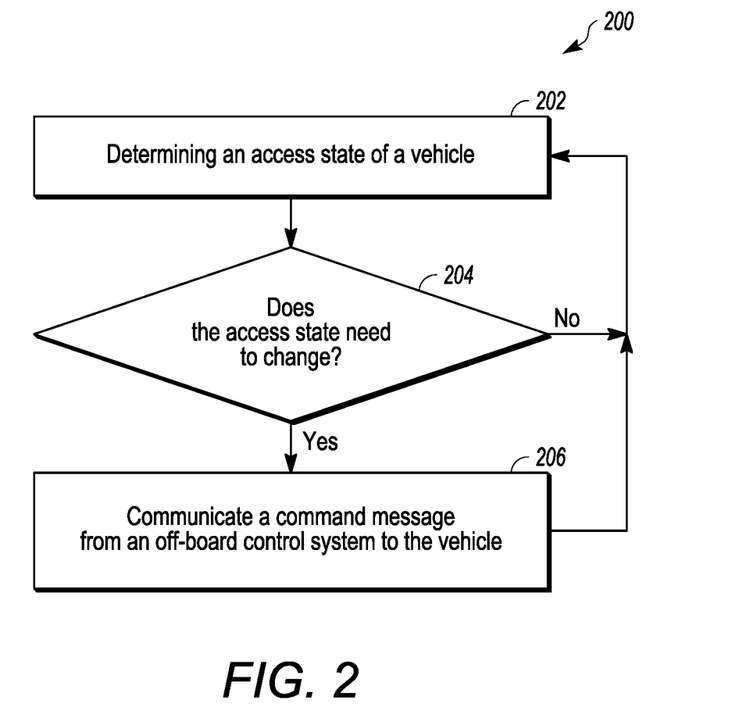
FIG. 2 illustrates a flowchart of one example of a method for controlling a vehicle system in accordance with one embodiment.

With reference to the system shown in FIG. 1, FIG. 2 illustrates a flowchart of one example of a method 200 for controlling a vehicle system in accordance with one embodiment. The operations described in connection with the method can be performed by the onboard and/or off-board controllers unless otherwise described herein.

At step 202, an access state of a vehicle is determined. The access state may be a locked access state or an unlocked access state. In one or more embodiments, the access state of the vehicle may be locked if an operator of the vehicle is prohibited or unable to access a location of the vehicle (e.g., accessing a yard, shed, or alternative location where the vehicle may be stored, or withholding knowledge of a yard or shed where the vehicle may be stored), unable to access an area internal to the vehicle (e.g., a cab, engine compartment, cargo bay, or the like), unable to change a power status of a component (e.g., is unable to power up or turn on a control console, a communication system, a battery system, engine starter, auxiliary electronics, or the like), is unable to engage the propulsion system and/or brake system of the vehicle, or the like. For example, the access state of the vehicle may be in the locked state if the operator or another individual onboard the vehicle is unable to access some area or location of the inside of the vehicle, but the operator is able to access the shed that houses the vehicle. Optionally, the access state of the vehicle may be in the locked state if the operator is unable to change a setting of the propulsion system, but is able to control an auxiliary electronic.

In one or more embodiments, the off-board control system may determine the access state of the vehicle. The access state may be determined based on one or more operational settings of the vehicle, based on sensor signals (e.g., still or video images, motion detection signals, or the like) received from the vehicle communication system, based on manual input into the onboard controller by an operator onboard the vehicle, or the like. Optionally, the off-board control system may determine the access state of the vehicle based on other information received from the onboard controller, information received from a wayside device, information received from another vehicle, or the like.

At step 204, a determination is made whether the access state is to be changed. For example, the off-board control system of the positive vehicle control (PVC) system may determine whether the access state needs to change. The PVC control system may determine that the vehicle is in the unlocked state, and that the access state should change to the locked state. Alternatively, the off-board control system may determine that the vehicle is in the locked state, and that the access state should change to the unlocked state.

In one or more embodiments, the access state may need to change if an operator onboard the vehicle has been away from the vehicle (or away from an onboard control system of the vehicle) for a predetermined amount of time (e.g., such as by motion detectors sensing a lack of motion). Optionally, the access state may need to change if an area within the vehicle is to be locked (e.g., to lock or hold an unauthorized individual inside the cab, prohibit the unauthorized individual from accessing the cab of the vehicle, or the like). Optionally, the access state may need to change to selectively lock portions of the vehicle (e.g., allowing access to an area of the vehicle but prohibiting an individual onboard the vehicle from changing an operational setting of the vehicle, such as the propulsion system or the brake system). Optionally, the access state may need to change based on environmental settings of the vehicle (e.g., a geographic location of the vehicle, ambient temperature, pressure, and/or humidity factors, or the like). Optionally, the access state may need to change based on the off-board control system receiving a request from the operator onboard the vehicle, from the onboard controller, from another vehicle, from a wayside device, or the like. For example, the operator may communicate a locking notification or request to the PVC control system requesting the PVC control system to remotely lock the vehicle or a portion of the vehicle. Optionally, the access state may need to change based on any alternative factor and/or scenario.

If the access state of the vehicle does not need to be changed, flow of the method returns to step 202, and the method may continue for a predetermined amount of time, while the vehicle is in transit, while the vehicle is in storage, or the like. Alternatively, if the access state of the vehicle is to be changed, flow of the method proceeds toward step 206.

At step 206, the off-board positive vehicle control (PVC) system may communicate a command message to the vehicle. If it is determined that the vehicle is in the unlocked state and the access state needs to change, the off-board PVC system may communicate a locking command message to the vehicle. Optionally, if the access state of the vehicle is in the unlocked state and needs to change, an operator onboard may communicate a locking request to the PVC system requesting the PVC system to remotely change the access state to the locked state. Optionally, the operator onboard the vehicle may independently change the access state to the locked state (e.g., without remote assistance from the off-board PVC system).

Alternatively, if the vehicle is determined to be in the locked state and the access state needs to change, the off-board control system may communicate an unlocking command message to the vehicle. The off-board control system may communicate the unlocking command message responsive to receiving an unlocking command request from the operator onboard the vehicle. Optionally, the off-board control system may communicate the unlocking command message responsive to independently determining that the access state may change to the unlocked state (e.g., without receiving an unlocking request from the operator). Optionally, the off-board control system may communicate the unlocking command message based on an alternative trigger. The locking and unlocking command messages remotely change the access state of the vehicle between the locked and unlocked states, respectively.

While the vehicle is in the locked state, the operator (or another individual) onboard the vehicle is unable to one or more of access one or more locations of the vehicle, access one or more areas internal to the vehicle, change a power settings (e.g., power up or down) of a component of the vehicle, engage a propulsion system of the vehicle, control a brake setting of the vehicle, control alternative operational settings of the vehicle, or the like.

In one or more embodiments, the off-board control system may remotely control the propulsion system of the vehicle to while the vehicle is in the locked state to slow or stop movement of the vehicle. Optionally, the off-board control system may change one or more operational settings to control a direction or movement of the vehicle while the off-board control system slows or stops movement of the vehicle. For example, the off-board control system may slow movement of the vehicle while also directing the vehicle away from the route (e.g., direct out of traffic of other vehicles). Optionally, the off-board control system may control one or more operational settings to remotely change the vehicle to the locked state or unlocked state based on operational settings of the vehicle or environmental conditions prior to the locking command message that is communicated. For example, the off-board controller may direct the vehicle to immediately stop movement responsive to receipt of the locking command message, or may direct the vehicle to slow movement at a predetermined rate based on the current speed of the vehicle, environmental conditions, locations or the vehicle (e.g., the grade of the route, the altitude of the vehicle, or the like). Optionally, the vehicle may be a drone or other unmanned flying object, and the off-board control system may direct the drone to land, to move to a different altitude, or the like. Optionally, the vehicle may be a rail vehicle system, and the off-board control system may control operation of one or more rail vehicles to control bunching and/or stretching of the rail vehicle system. Optionally, the off-board control system may remotely control operation of the vehicle based on the grade of the route, a geographic location or area of the vehicle, ambient conditions, based on a location of the vehicle (e.g., at or within an intersection of intersecting routes, if the vehicle is on a bridge or within a tunnel), based on an elevation and/or altitude of the vehicle, or the like. For example, the off-board control system may control or allow the vehicle to cross the bridge or move through the tunnel, but may slow or stop movement of the vehicle after the vehicle has cleared the bridge or tunnel.

In one or more embodiments, the off-board control system may assign a priority level to the locking and/or unlocking command message that is greater than a priority level of another message communicated to the vehicle. For example, the vehicle may receive messages from the off-board control system, from wayside devices, from other vehicles, or the like. The off-board control system may assign a priority level to the locking and/or unlocking command message such that the onboard control system prioritizes, receives, addresses, or the like, prior to or ahead of other messages, such as messages with a lower priority level or messages with no priority indication.

In one or more embodiments, the locking and/or unlocking command message may include an alert that is communicated to the operator indicating to the operator that the access state of the vehicle is changing or has changed. For example, the alert may be an audio message or sound, a notification displayed on an output device of the onboard controller, turning on or off of a visual alert such as a flashing light, or the like. In one embodiment, the operator onboard the vehicle may communicate with the originator of the locking command message (e.g., with the off-board control system, the wayside device, or the like) responsive to the access state of the vehicle changing between the locked and unlocked states and the operator receiving the alert. For example, the onboard controller may receive an alert indicating the receipt of the locking command message by the onboard controller from the off-board control system, and the operator may communicate with the off-board control system information related to one or more settings and/or an environment of the vehicle, such as a confirmation of an issue happening at the vehicle, or the like.

In one or more embodiments, the onboard controller may receive a locking command message, however the operator may manually override the locking command message with an authenticated code. For example, the locking command message may be in error, and the operator may manually override the locking command message to prohibit or stop the access state of the vehicle from changing from an unlocked state to a locked state. Optionally, the authenticated code may need to be entered by or verified by two or more different operators, such as different operators disposed at different areas of the vehicle, prior to the locking command message being overridden by the vehicle.

In one or more embodiments, the locking command message and/or the unlocking command message may be encrypted, may have an authentication code or other information associated with the message, or the like. For example, the locking command message may include an identification code that the onboard controller may verify prior to the locking command message changing the access state of the vehicle. The identification code or authentication of the source of the locking command message may be verified to be a known source. For example, the onboard controller may receive a locking command message from a known off-board control system, and may reject, refuse, or ignore a locking command message from an alternative unknown source. Optionally, the onboard controller may receive locking command messages through a secured communication pathway, and may reject locking command messages received through unsecured communication pathways. Optionally, the system may include additional and/or alternative security measures, systems, encryption methods, or the like.

In one or more embodiments, the off-board control system may remotely control one or more of the sensors onboard the vehicle, or other sensors off-board the vehicle (e.g., such as disposed at wayside devices, or the like) while the vehicle is in the locked state. For example, the off-board control system may control a camera onboard the vehicle to receive real time images and/or videos of one or more areas of the vehicle, such as within the cab of the vehicle, of operators onboard and/or proximate to the vehicle, images of the cargo bay, or the like, while the vehicle is in the locked state. In one embodiment, the off-board control system may control one or more functions of the camera (e.g., zoom, rotation, night-vision, or the like) to control the information captured by the one or more sensors. Optionally, the off-board control system may control a motion detector onboard the vehicle, such as to change an amount of time between when the motion detector detects motion and changes to an off or sleep state.

The access state of the vehicle may be changed from the unlocked state to the locked state by the onboard controller, the off-board control system, an operator onboard the vehicle, or the like. In one or more embodiments, the access state may be changed from the locked state to the unlocked state by the off-board control system, by a wayside device, or the like. For example, the onboard controller, and/or an operator onboard the vehicle, may change or is allowed to change the access state from the unlocked state to the locked state, but the operator onboard the vehicle may be prohibited from changing the access state from the locked state to the unlocked state. For example, an operator onboard the vehicle may lock the vehicle, but may be unable to unlock the vehicle. In order to unlock the vehicle, or change the access state from the locked state to the unlocked state, the operator onboard the vehicle may send an unlocking request to the off-board positive vehicle control (PVC) system requesting the PVC system to remotely unlock the vehicle. Optionally, the onboard controller may automatically communicate a request to the off-board control system to change the state from the locked state to the unlocked state (e.g., without an operator manual input).

Responsive to the command message being communicated by the off-board control system to the vehicle, the method may proceed toward step 202, and the method may continue while the vehicle is in operation, while the vehicle is stored at a yard or shed, while the vehicle, while a particular cargo is being transported by the vehicle, while the vehicle is within a predetermined geographic area, or the like.

In one embodiment of the subject matter described herein, a method includes determining an access state of a vehicle and communicating a locking command message from an off-board control system to remotely change the access state of the vehicle between a locked state and an unlocked state. In the locked state, an operator onboard the vehicle is unable to one or more of access a location of the vehicle, access an area internal to the vehicle, change a power setting of a component of the vehicle, or engage a propulsion system of the vehicle. The operator onboard the vehicle is prohibited from changing the access state from the locked state to the unlocked state without assistance from the off-board control system. The operator onboard the vehicle may be allowed to change the access state from the unlocked state to the locked state without assistance from the off-board control system.

Optionally, the method includes determining that the access state is to change from the locked state to the unlocked state, and communicating an unlocking command message from the off-board control system to the vehicle to remotely change the access state of the vehicle from the locked state to the unlocked state.

Optionally, the operator may be prohibited from controlling one or more operational settings of the vehicle while the access state of the vehicle is in the locked state.

Optionally, the operator may be prohibited from controlling one or more of a power setting or a brake setting of the propulsion system while the access state of the vehicle is in the locked state.

Optionally, the method includes communicating the locking command message from the off-board control system to remotely change the access state of the vehicle from the unlocked state to the locked state responsive to receiving a locking request from the vehicle.

Optionally, the method includes remotely controlling the propulsion system of the vehicle while the access state of the vehicle is in the locked state to slow or stop movement of the vehicle.

Optionally, the method includes alerting the operator that the access state of the vehicle is in the locked state or the unlocked state.

Optionally, the method includes assigning a priority level to the locking command message that is greater than a priority level of another message communicated to the vehicle.

Optionally, the method includes receiving one or more images of the vehicle at the off-board control system while the access state of the vehicle is in the locked state.

Optionally, the method includes remotely controlling one or more sensors onboard the vehicle while the access state of the vehicle is in the locked state.

In another embodiment of the subject matter described herein, a control system includes a controller having one or more processors configured to determine an access state of a vehicle, and a communication system configured to communicate a locking command message to the vehicle to remotely change the access state of the vehicle between a locked state and an unlocked state. In the locked state, one or more of an operator or an individual onboard the vehicle is unable to one or more of access a location of the vehicle, access an area internal to the vehicle, change a power setting of a component of the vehicle, or engage a propulsion system of the vehicle.

Optionally, the controller may be configured to determine that the access state is to change from the locked state to the unlocked state, and the communication system may communicate an unlocking command message to the vehicle to remotely change the access state of the vehicle from the locked state to the unlocked state. The operator or the individual onboard the vehicle may be prohibited from changing the access state from the locked state to the unlocked state.

Optionally, the one or more of the operator or the individual may be prohibited from controlling one or more operational settings of the vehicle while the access state of the vehicle is in the locked state.

Optionally, the controller may remotely control one or more operational settings of the vehicle while the access state of the vehicle is in the locked state.

Optionally, the controller may remotely controller the propulsion system of the vehicle while the access state of the vehicle is in the locked state to one or more of slow or stop movement of the vehicle.

Optionally, the communication system may communicate the locking command message to remotely change the access state of the vehicle from the unlocked state to the locked state responsive to the communication system receiving a locking request from the vehicle.

Optionally, the controller may assign a priority level to the locking command message that is greater than a priority level of another message communicated to the vehicle.

Optionally, the communication system may alert the operator or the individual that the access state of the vehicle is in the locked state.

Optionally, the controller may receive one or more images of the vehicle while the access state of the vehicle is in the locked state.

Optionally, the controller may remotely control one or more sensors onboard the vehicle while the access state of the vehicle is in the locked state.

In one embodiment of the subject matter described herein, a method includes receiving a locking notification from a vehicle indicating that an access state of the vehicle is to change from an unlocked state to a locked state. An unlocking request may be received from the vehicle indicating a request to change the access state from the locked state to the unlocked state. It may be determined whether the access state of the vehicle is allowed to change from the locked state to the unlocked state. An unlocking command message may be communicated from an off-board positive vehicle control (PVC) system to the vehicle to remotely change the access state from the locked state to the unlocked state responsive to determining that the access state of the vehicle is allowed to change from the locked state to the unlocked state. An operator onboard the vehicle may be prohibited from changing the access state from the locked state to the unlocked state.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   determining an access state of a vehicle; and
   communicating a locking command message from an off-board control system to remotely change the access state of the vehicle between a locked state and an unlocked state,
   wherein, in the locked state, an operator onboard the vehicle is unable to one or more of:
      access a location of the vehicle,
      access an area internal to the vehicle,
      change a power setting of a component of the vehicle, or
      engage a propulsion system of the vehicle,
   wherein the operator onboard the vehicle is allowed to change the access state from the locked state to the unlocked state responsive to receiving unlocking permissions from the off-board control system,
   wherein the operator onboard the vehicle is prohibited from changing the access state from the locked state to the unlocked state without receiving the unlocking permissions from the off-board control system, and
   wherein the operator onboard the vehicle is allowed to change the access state from the unlocked state to the locked state without assistance from the off-board control system.

2. The method of claim 1, further comprising determining that the access state is to change from the locked state to the unlocked state, and communicating an unlocking command message from the off-board control system to the vehicle to remotely change the access state of the vehicle from the locked state to the unlocked state.

3. The method of claim 1, wherein the operator is prohibited from controlling one or more operational settings of the vehicle while the access state of the vehicle is in the locked state.

4. The method of claim 1, wherein the operator is prohibited from controlling one or more of a power setting or a brake setting of the propulsion system while the access state of the vehicle is in the locked state.

5. The method of claim 1, further comprising communicating the locking command message from the off-board control system to remotely change the access state of the vehicle from the unlocked state to the locked state responsive to receiving a locking request from the vehicle.

6. The method of claim 1, further comprising remotely controlling the propulsion system of the vehicle while the access state of the vehicle is in the locked state to slow or stop movement of the vehicle.

7. The method of claim 1, further comprising alerting the operator that the access state of the vehicle is in the locked state or the unlocked state.

8. The method of claim 1, further comprising assigning a priority level to the locking command message that is greater than a priority level of another message communicated to the vehicle.

9. The method of claim 1, further comprising receiving one or more images of the vehicle at the off-board control system while the access state of the vehicle is in the locked state.

10. A control system comprising:
    a controller having one or more processors configured to determine an access state of a vehicle; and
    a communication system configured to communicate a command message to the vehicle to remotely change the access state of the vehicle between a locked state and an unlocked state,
    wherein, in the locked state, an operator onboard the vehicle is prohibited from changing the access state of the vehicle from the locked state to the unlocked state,
    wherein the communication system is configured to communicate unlocking permissions in the command message to the vehicle to allow the operator onboard the vehicle to change the access state from the locked state to the unlocked state, and
    in the locked state, the operator is unable to one or more of:
       access a location of the vehicle,
       access an area internal to the vehicle,
       change a power setting of a component of the vehicle, or
       engage a propulsion system of the vehicle.

11. The control system of claim 10, where the controller is configured to determine that the access state is to change from the locked state to the unlocked state, and the communication system is configured to communicate an unlocking command message including the unlocking permissions to the vehicle to allow the operator to change the access state of the vehicle from the locked state to the unlocked state.

12. The control system of claim 10, wherein the the operator is prohibited from controlling one or more operational settings of the vehicle while the access state of the vehicle is in the locked state.

13. The control system of claim 10, wherein the controller is configured to remotely control one or more operational settings of the vehicle while the access state of the vehicle is in the locked state.

14. The control system of claim 10, wherein the controller is configured to remotely control the propulsion system of the vehicle while the access state of the vehicle is in the locked state to one or more of slow or stop movement of the vehicle.

15. The control system of claim 10, wherein the communication system is configured to communicate the command message to remotely change the access state of the vehicle from the unlocked state to the locked state responsive to the communication system receiving a locking request from the vehicle.

16. The control system of claim 10, wherein the controller is configured to assign a priority level to the locking command message that is greater than a priority level of another message communicated to the vehicle.

17. The control system of claim 10, wherein the communication system is configured to alert the operator that the access state of the vehicle is in the locked state.

18. The control system of claim 10, wherein the controller is configured to receive one or more images of the vehicle while the access state of the vehicle is in the locked state.

19. The control system of claim 10, wherein the controller is configured to remotely control one or more sensors onboard the vehicle while the access state of the vehicle is in the locked state.

20. A method comprising:
receiving a locking notification from a vehicle indicating that an access state of the vehicle is to change from an unlocked state to a locked state;
receiving an unlocking request from the vehicle indicating a request to change the access state from the locked state to the unlocked state, wherein an operator onboard the vehicle is allowed to change the access state from the locked state to the unlocked state responsive to receiving unlocking permissions from an off-board positive vehicle control (PVC) system;
determining if the access state of the vehicle is allowed to change from the locked state to the unlocked state; and
communicating the unlocking permissions including an unlocking command message from the off-board positive vehicle control (PVC) system to the vehicle to remotely change the access state from the locked state to the unlocked state responsive to determining that the access state of the vehicle is allowed to change from the locked state to the unlocked state, wherein an operator onboard the vehicle is prohibited from changing the access state from the locked state to the unlocked state without receiving the unlocking permissions from the off-board positive vehicle control (PVC) system.

21. The control system of claim 10, wherein the vehicle is one or more of a land vehicle or a marine vessel.

22. A control system, comprising:
a controller having one or more processors configured to control an access state of a vehicle; and
a communication system configured to receive a command message from an off-board control system to change the access state of the vehicle between a locked state and an unlocked state,
wherein, in the locked state, the controller is configured to prohibit an operator onboard the vehicle from changing the access state of the vehicle from the locked state to the unlocked state,
wherein the controller is configured to allow the operator onboard the vehicle to change the access state from the locked state to the unlocked state responsive to receiving unlocking permissions from the off-board control system, and
in the locked state, the operator is unable to one or more of:
access a location of the vehicle,
access an area internal to the vehicle,
change a power setting of a component of the vehicle, or
engage a propulsion system of the vehicle.

* * * * *